March 24, 1925.  W. J. McMILLIN ET AL  1,530,901
TUBE SPLICING MANDREL
Filed April 2, 1924  2 Sheets-Sheet 1
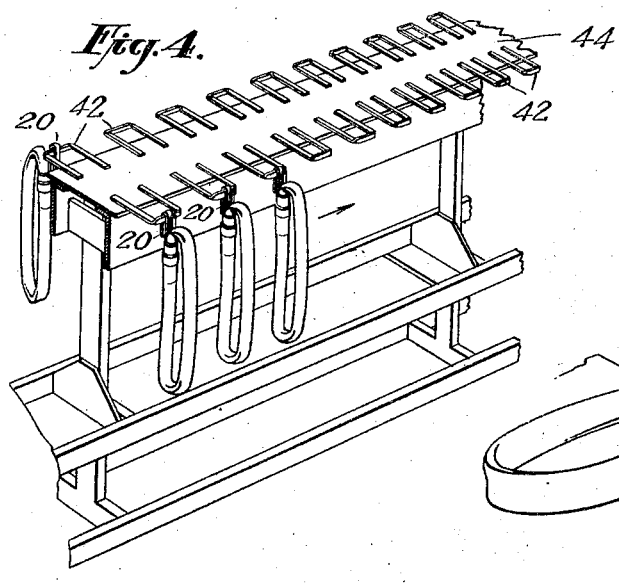
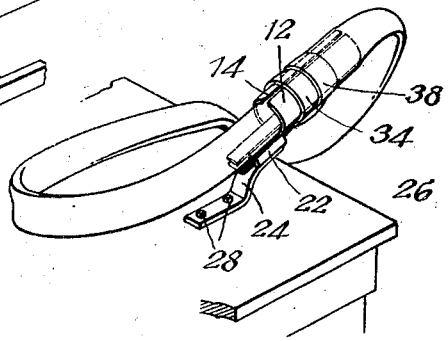
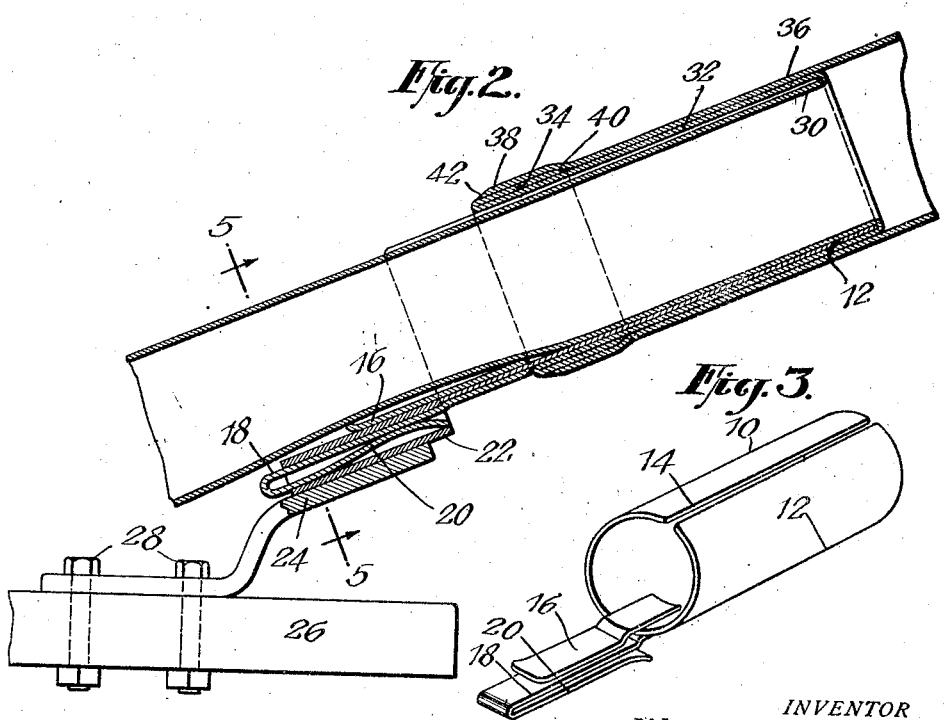
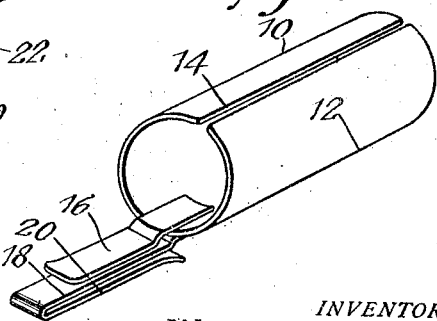
INVENTOR
WILLIAM JOHN McMILLIN.
BY DANIEL FAY HUNT.
ATTORNEY March 24, 1925.    W. J. McMILLIN ET AL    1,530,901
TUBE SPLICING MANDREL
Filed April 2, 1924    2 Sheets-Sheet 2
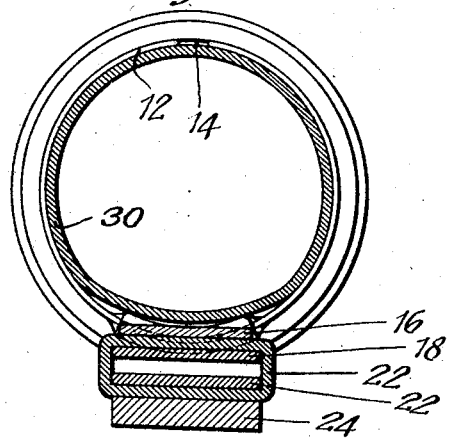
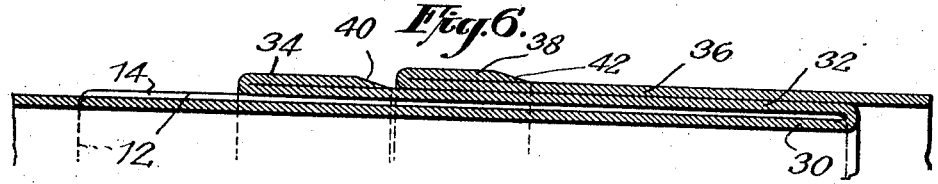
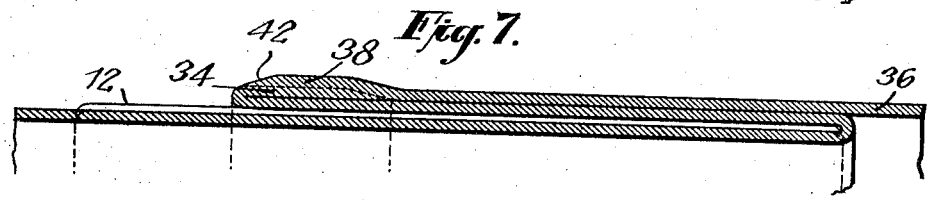
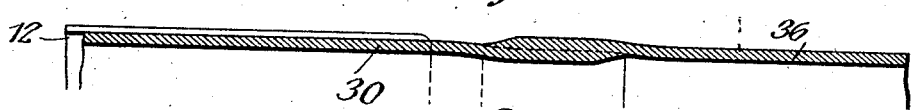
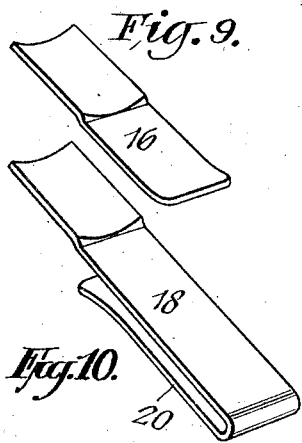
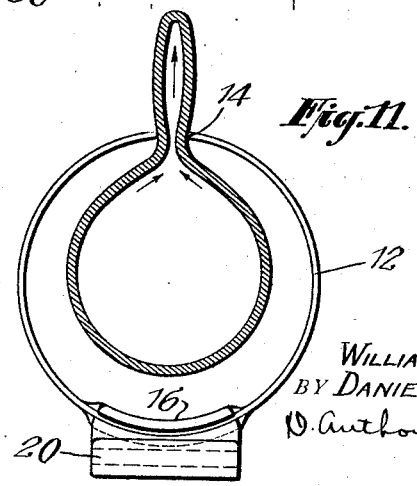
INVENTOR
WILLIAM JOHN McMILLIN.
BY DANIEL FAY HUNT.
ATTORNEY Patented Mar. 24, 1925.

1,530,901

UNITED STATES PATENT OFFICE.

WILLIAM JOHN McMILLIN AND DANIEL FAY HUNT, OF BUFFALO, NEW YORK, ASSIGNORS TO DUNLOP TIRE AND RUBBER CORPORATION OF AMERICA, OF BUFFALO, NEW YORK, A CORPORATION OF NEW YORK.

TUBE-SPLICING MANDREL.

Application filed April 2, 1924. Serial No. 703,608.

*To all whom it may concern:*

Be it known that we, WILLIAM JOHN MCMILLIN and DANIEL FAY HUNT, citizens of the United States, and residents of Buffalo, in the county of Erie and State of New York, have invented certain new and useful Improvements in Tube-Splicing Mandrels, of which the following is a specification.

The invention relates to an improved apparatus for use in the manufacture of rubber tubes and particularly in means for joining or splicing the ends of said tubes.

While not limited thereto, the apparatus illustrated is adapted for use in the manufacture of inner tubes for automobile tires. The invention aims to provide means whereby the ends of the tube can be overlapped on a mandrel which is rigidly supported, this mandrel being provided with a member by which the tube can be hung or suspended from suitable brackets on a travelling conveyor.

An embodiment of the invention is illustrated in the accompanying drawings in which Fig. 1 is a perspective view showing the mandrel detachably secured to a fixed support;

Fig. 2 is a longitudinal section through the mandrel and a supporting fixture or bracket;

Fig. 3 is a detail view of the tube splicing mandrel;

Fig. 4 is a perspective view showing a plurality of tubes supported on their mandrels which in turn are suspended from brackets carried by a conveyor belt.

Fig. 5 is a detail section on an enlarged scale taken on line 5—5 of Fig. 2;

Figs. 6, 7 and 8 are fragmentary views illustrating different steps in the operation of splicing the tube supported by the mandrel;

Figs. 9 and 10 are detail views showing respectively a mandrel clip and hook;

Fig. 11 is an end view illustrating the manner of withdrawing of the tube from the mandrel.

Referring in detail to the drawings, the tube splicing mandrel represented as a whole by the numeral 10 comprises a substantially cylindrical sleeve 12 having a longitudinal slot 14 formed in the wall thereof and extending from one end to the other as shown in Fig. 3. At a point approximately diametrically opposite to the support 14 and secured to the inner wall of the sleeve 12 is a longitudinally projecting clip 16 which is welded or otherwise secured to the sleeve. To the outer surface of the sleeve 12 there is secured a supporting member 18 which is preferably formed of somewhat resilient material and provided with a hooked end 20.

The clip 16 and member 18 are substantially the same width, as shown in Fig. 5, and are adapted to be engaged with a socket member 22 which is secured to a bracket 24 which is in turn fastened to a bench or table 26 by means of suitable bolts 28. As shown in Fig. 2 the mandrel 10 is supported in an inclined position and is firmly yet detachably secured in the socket by reason of the engagement of the clip 16 and the member 18. When the hook portion of the latter member is inserted in the socket, the hooked end of said member 18 is flexed and it thereby yieldingly locks the mandrel to the bracket.

This form of support is very advantageous as it permits the operator to use both hands in splicing the tube, it being unnecessary for him to be concerned in supporting the mandrel in working position.

The tube is conveniently spliced on the mandrel by first inserting one end through the mandrel and doubling a portion 32 thereof over the outer surface of the mandrel as in Fig. 6. The extreme end of the tube is then folded back to form a cuff 34. The opposite end of the tube 36 is now pulled over the portion 32 and a portion 38 thereof is folded back as shown in Fig. 6. The extreme ends of the tube are skived or beveled off as shown at 40 and 42. This operation is preferably performed before the tubes are placed on the splicing mandrel. Cement is applied to the exposed portions 34 and 38 of the tube ends and the portion 38 is folded over the portion 34 as indicated in Figs. 2 and 7. This forms a cemented splice which is subsequently vulcanized so as to make the joint absolutely air-tight.

It will be appreciated that by splicing or cementing the ends of the tubes while they are supported on a cylindrical mandrel, an even pressure can be exerted on all portions of the joint so that a smooth, even juncture can be made.

It is advantageous to vulcanize the joint while it is supported on the splicing mandrel and to these ends I provide means whereby the tube may be supported on the splicing mandrel during vulcanization. After the joints have been cemented it is important that they be permitted to dry for a short length of time without one overlapped portion being moved relative to the other. The mandrel described provided with the supporting member 18 permits the same together with its cemented or spliced tube to be supported in a position in which the joint will not be disturbed during the time the cement is drying.

As shown in Fig. 4, the hooked ends 20 of the mandrels are adapted for engagement with brackets 42 carried by a conveyor belt 44 which is adapted to carry the spliced or cemented tubes to the vulcanizer where the tubes are subjected to a treatment to vulcanize the joints. The joints are preferably vulcanized while the tubes are on the mandrels. After they are securely vulcanized the folded ends of the tube may be straightened out as shown in Fig. 8 and the tube may be removed from the mandrel by collapsing and pulling it through the slot 14 as illustrated in Fig. 11.

From the foregoing it will be apparent that our improved mandrel provides means whereby the latter is supported while the ends of the tubes are being spliced and also permits the tubes to be suspended from a conveyor while the united ends thereof are drying so that a smooth uniform air-tight joint may be secured.

Though we have described with great particularity the details of construction of the embodiments of the invention illustrated, it is not to be construed that we are limited thereto as changes in the arrangement and substitution of equivalents may be made by those skilled in the art without departing from the invention as defined in the appended claims.

What we claim is:—

1. A tube splicing mandrel having a member secured thereto adapted to support the mandrel while the ends of a tube are being spliced thereon and also to suspend the mandrel and tube from a conveyor while the united ends of the tube are drying.

2. A tube splicing mandrel having a yielding member secured thereto adapted to support the mandrel while the ends of a tube are being spliced thereon, and a fixture having a portion coacting with said member to detachably support the mandrel in proper working position.

3. A tube splicing mandrel comprising a sleeve having a longitudinal slot formed therein to permit the removal of a spliced tube therefrom, a fixture for supporting the mandrel while the splice is being made, and a member secured to said sleeve adapted to support the latter on said fixture and also to sustain the mandrel and tube after they have been disengaged from said fixture.

4. A tube splicing mandrel having a hook secured thereto adapted for engagement with different members whereby the mandrel is first supported on a fixed member and then suspended from a travelling member.

5. A tube splicing mandrel of the class described comprising a substantial cylindrical sleeve having a longitudinally extending slot formed therein, a hook secured to the wall of the mandrel at one end and substantially diametrically opposite said slot, a clip secured to the mandrel and over-lapping part of said hook and a fixture having a socket for engagement with said hook and clip substantially as described.

6. In combination with a conveyor, a tube splicing mandrel for supporting a spliced tube, said mandrel having a hook for suspending the tube from said conveyor.

7. In combination with a conveyor, a tube splicing mandrel for supporting the overlapped cemented ends of a spliced tube during the drying of the cemented joint and the vulcanization thereof, said mandrel having a member for detachable engagement with said conveyor.

In witness whereof, we have hereunto signed our names.

WILLIAM JOHN McMILLIN.
DANIEL FAY HUNT.